July 26, 1955  J. A. FITZGIBBONS  2,713,779
THERMAL JUG
Filed July 20, 1953
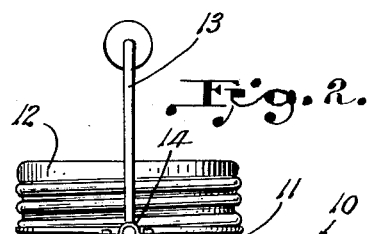
Fig. 1.
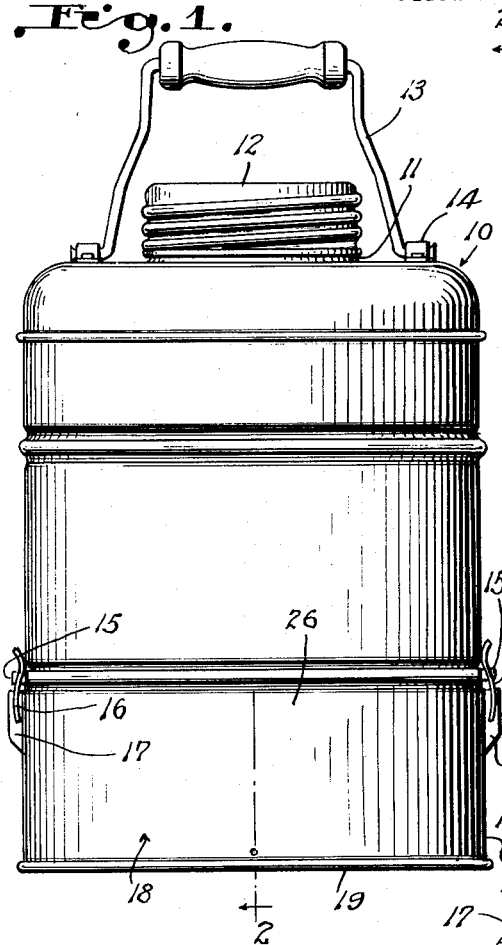
Fig. 3.
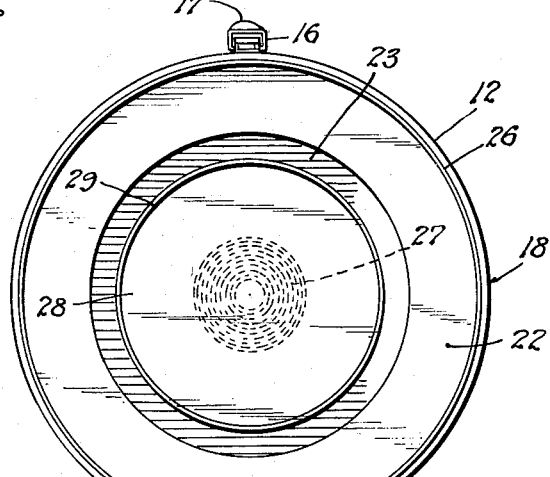
INVENTOR,
John A. Fitzgibbons
BY
E. C. Vrooman & Co.,
ATTORNEYS.

United States Patent Office 2,713,779
Patented July 26, 1955

2,713,779
THERMAL JUG
John A. Fitzgibbons, Azusa, Calif.

Application July 20, 1953, Serial No. 368,877

2 Claims. (Cl. 62—165)

This invention relates to a refrigerant container, thermal jug or bottle, and has as its primary object the provision of such device wherein the contents are not only maintained at the temperature at which they are initially positioned in the receptacle, but wherein the temperature of the contents may be substantially lowered.

A more specific object of the invention is the provision of such a device provided with a primary receptacle adapted to contain food or the like to be refrigerated, and a secondary receptacle adapted to contain a refrigerant such as $CO_2$ or Dry Ice.

A further and more specific object of the invention is the provision of means in the secondary receptacle adapted to bias, under spring pressure, the Dry Ice into close juxtaposition with the bottom of the primary receptacle.

Still other objects reside in the combination of elements, arrangement of parts and features of construction, all as will be more fully pointed out and shown in the accompanying drawing.

In the drawing:

Fig. 1 is a side elevational view of one form of device embodying features of the inventive concept.

Fig. 2 is a view partially in sections taken substantially along the line 2—2 of Fig. 1 is viewed in the direction indicated in the arrows.

Fig. 3 is a top plan view of the lower or refrigerant containing portion of the device.

Similar reference characters refer to similar parts throughout the several views of the drawing.

Having reference now to the drawing in detail, there is generally indicated at 10 a jug or similar receptacle of generally conventional construction, formed with double walls having an insulating packing therebetween in the conventional manner. Receptacle 10 is provided with an upwardly extending neck 11, upon which is adapted to be threaded cap or closing member 12, also of conventional design. A suitable handle member 13 is mounted in suitable journals 14 on top of the receptacle.

The structure heretofore described has been that of a known or conventional thermos jug, but in the instant embodiment there is provided a pair of oppositely disposed radially positioned lugs 15 adapted to be engaged by clamping members 16 pivotally mounted in lugs 17 carried by a lower or auxiliary receptacle 18 which receptacle comprises the basic feature of the instant invention. Receptacle 18 includes a base 19 and an outer circular wall 20. Below the upper extremity of wall 20 is a horizontally disposed flange 21, which terminates on its inner side in an inverted circular wall 22, forming a pocket closed at its bottom by partition 23 suitably spaced from the bottom wall 19. The space between horizontal bases 19 and 23 and between walls 20 and 22 is filled with a suitable insulating material 25 of any desired type. The peripheral flange 21 serves as a seat for the bottom of receptacle 10, while the portion 26 of side wall 20 extending above flange 22 surrounds the lower portion of jug 10 to hold the same in aligned position.

Centrally positioned on plate 23 is a compression spring 27, which serves as a support for a plate or pan 28, provided with a peripheral upstanding flange 29.

In the use and operation of the device a piece of Dry Ice or $CO_2$ is positioned on the plate 28 and held centered thereon by means of flange 29. When the jug 10 is seated within the flange 26 on horizontal flange 21 the pressure of spring 27 serves to bias the Dry Ice against the bottom of the receptacle or jug 10. The clamping means 15 and 16 serve to hold the parts 10 and 18 in related assembly, and the contents of the receptacle 10 are thus thoroughly chilled by means of the Dry Ice.

From the foregoing it will now be seen there is herein provided a device which accomplished all of the objects of this invention and others, including many advantages of great practical utility and commercial importance.

As many embodiment may be made of this inventive concept, and as many modifications may be made of the embodiment hereinbefore shown and described, it is to be understood that all matter herein is to be interpreted merely as illustrative and not in a limiting sense.

I claim:

1. A thermal jug comprising a main cylindrical primary receptacle having a closed bottom and an open top, said receptacle being provided with a removable closure for said top, and an auxiliary receptacle having an imperforate circular base and a peripheral upstanding wall fitting around the lower end of the primary receptacle, said auxiliary receptacle having an internal flange projecting from the inner face of said wall and forming a support for the peripheral portion of the bottom of the primary receptacle, said auxiliary receptacle having a wall depending from the inner edge of said flange spaced parallel to said peripheral wall and having a partition closing the space at the bottom of the depending wall, said partition being spaced above the bottom of said auxiliary receptacle and forming an open topped pocket below the central portion of the base of the primary receptacle, means to releasably secure said receptacles together, and means in said pocket for supporting a refrigerant in the pocket against the bottom of the primary receptacle.

2. A thermal jug comprising a main cylindrical primary receptacle having a closed bottom and an open top, said receptacle being provided with a removable closure for said top, and an auxiliary receptacle having an imperforate circular base and a peripheral upstanding wall fitting around the lower end of the primary receptacle, said auxiliary receptacle having an internal flange projecting from the inner face of said wall and forming a support for the peripheral portion of the bottom of the primary receptacle, said auxiliary receptacle having a wall depending from the inner edge of said flange spaced parallel to said peripheral wall and having a partition closing the space at the bottom of the depending wall, said partition being spaced above the bottom of said auxiliary receptacle and forming an open topped pocket below the central portion of the base of the primary receptacle, means to releasably secure said receptacles together, and means in said pocket for supporting a refrigerant in the pocket against the bottom of the primary receptacle, said last means including a tray for holding refrigerant and a coiled compression spring interposed between the pocket and tray.

References Cited in the file of this patent

UNITED STATES PATENTS

| Number | Name | Date |
|---|---|---|
| 214,998 | Frost | May 6, 1879 |
| 216,635 | Warner | June 17, 1879 |
| 358,468 | Moore | Mar. 1, 1887 |
| 1,803,639 | Payson | May 5, 1931 |
| 2,068,384 | Newport | Jan. 19, 1937 |
| 2,405,764 | Smith | Aug. 13, 1946 |
| 2,447,716 | Rowe | Aug. 24, 1948 |
| 2,462,461 | Bird | Feb. 22, 1949 |

FOREIGN PATENTS

| Number | Country | Date |
|---|---|---|
| 409,822 | France | May 2, 1910 |
| 520,579 | Germany | Jan. 27, 1928 |